United States Patent [19]

Chuan-Yuan et al.

[11] Patent Number: 5,450,337
[45] Date of Patent: Sep. 12, 1995

[54] TWO-DIMENSION UNBALANCE CORRECTION DEVICE

[75] Inventors: Chung Chuan-Yuan, Hsinchu; Cuo Shy-Pyng, Hsinchu Hsien, both of Taiwan

[73] Assignee: Industrial Technology Research Institute, Hsinchu, Taiwan

[21] Appl. No.: 18,036

[22] Filed: Feb. 16, 1993

[51] Int. Cl.$^6$ .................. G01M 1/00; G01M 1/08
[52] U.S. Cl. .................. 364/571.01; 73/66; 74/573 R; 82/903; 301/5.21
[58] Field of Search .......... 364/571.01, 463, 570, 364/571.02; 73/66, 455, 456, 457, 458, 460, 461, 462, 468, 469; 74/573 R; 82/903; 301/5.21; 310/51

[56] References Cited

U.S. PATENT DOCUMENTS

| | | | |
|---|---|---|---|
| 3,810,392 | 5/1974 | Green et al. | 73/458 |
| 3,811,327 | 5/1974 | Hack | 73/465 |
| 4,380,925 | 4/1983 | Martino | 73/66 |
| 4,424,711 | 1/1984 | Giers et al. | 73/462 |
| 4,817,003 | 3/1989 | Nagase et al. | 364/463 |
| 4,835,827 | 1/1989 | Marra | 29/156.8 R |
| 4,879,792 | 11/1989 | O'Connor | 29/156.4 R |
| 4,986,149 | 1/1991 | Carmel et al. | 82/1.11 |
| 5,172,325 | 12/1992 | Heidari | 364/463 |
| 5,208,758 | 5/1993 | Okumura | 364/463 |
| 5,243,788 | 9/1993 | Rossmann et al. | 51/169 |
| 5,267,140 | 11/1993 | Ibe | 364/148 |
| 5,329,814 | 7/1994 | Betz et al. | 73/462 |

Primary Examiner—Emanuel T. Voeltz
Assistant Examiner—Patrick J. Assouad
Attorney, Agent, or Firm—W. Wayne Liauh

[57] ABSTRACT

A two-dimension unbalance correction device, or a two-dimension balancing apparatus, is designed to correct a rotor by resolving the measured unbalance vector into a horizontal component and a vertical component, and then correcting the resolved components respectively. The balancing apparatus comprises a horizontal and a vertical balancing mechanism in the form of a symmetric correction disc, which is fixed to an end plane of the rotor and synchronously rotated therewith. The correction disc is engraved with a plurality of concentric circles, radial lines, and phase angles for indicating the magnitude and the phase angle of the unbalance vector during the correcting process. The balancing apparatus is further provided with a trial weight bolt, which cooperates with the trial screw for normalizing the linear scale of the correction disc and the vectermeter of the balancing apparatus. In performing the unbalance correction, a correction bolt, whose weight is a multiple or a fraction of the trial weight bolt is used in conjunction with the regulation slot at a proper position on the correction disc for correcting the unbalance vector on the vertical and/or the horizontal axis, respectively.

7 Claims, 13 Drawing Sheets

TWO-DIMENSION UNBALANCE CORRECTION DEVICE

BACKGROUND OF THE INVENTION

The present invention relates to a two dimension unbalance correction device, and more particularly to an improved device for correcting an unbalance rotor by resolving the unbalance vector of the rotor into two components and then performing the correction procedure.

Figure 1:
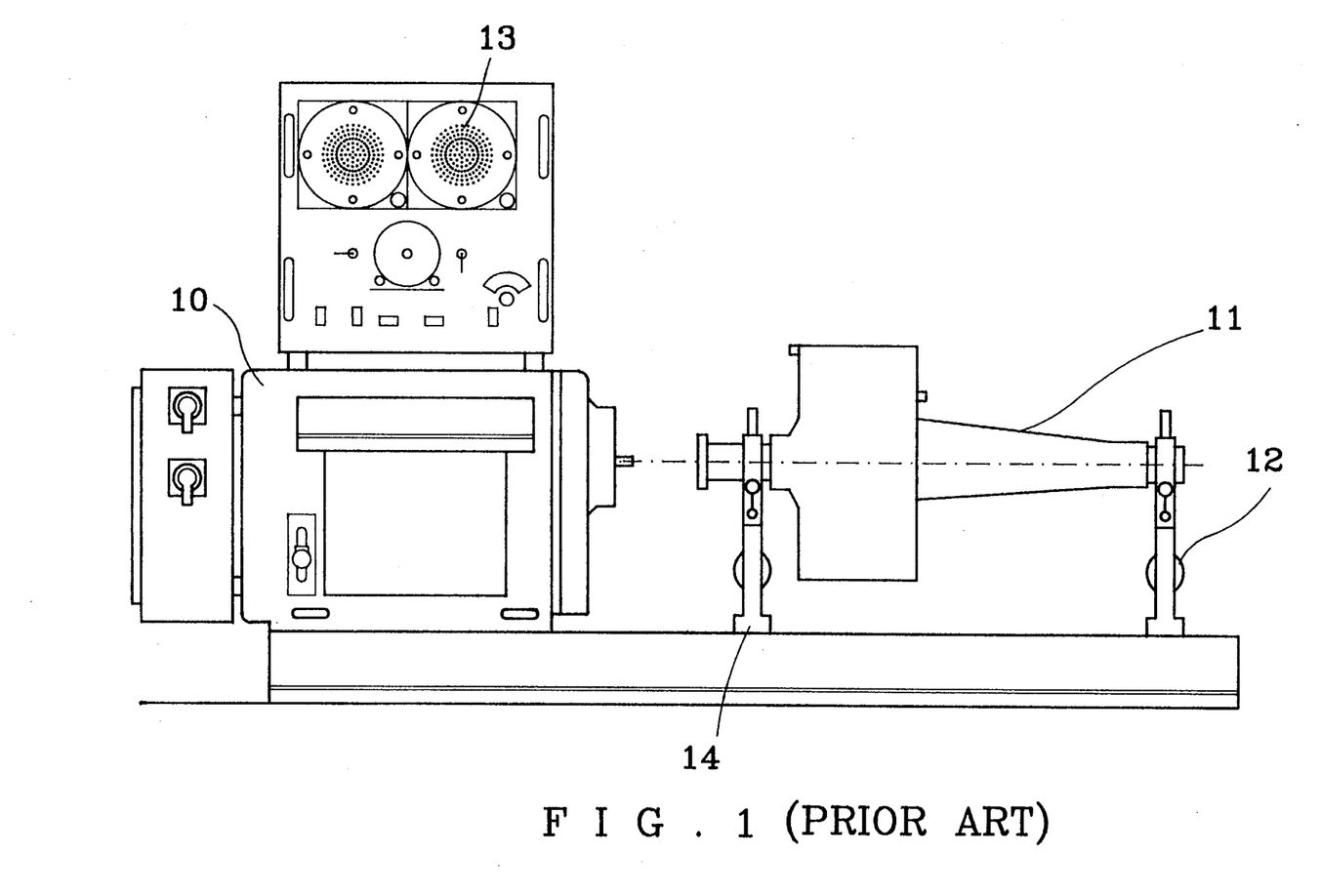
FIG. 1 is a plane view of a conventional unbalance correction device illustrating a rotor being set on a pair of pedestals of the balancing machine for performing the conventional correction processes.

In a conventional system as shown in FIG. 1, a rotor 11 is generally supported by a pair of pedestals 14 of a balancing machine 10. The rotor 11 may be rotated by a driving device such as a driving motor (not shown). During rotation of the rotor, in case that the rotor has an initial unbalance, i.e. the mass center of the rotor is inconsistent to the rotation axis of the rotor, a centrifugal force will apply to the rotor. As a result, the centrifugal force will cause vibration and wobbling in the rotor.

It is known that the conventional balancing machine is provided with a phase detector and a pair of amplitude detectors 12 as shown in FIG. 1. The functions of the phase detector and the amplitude detectors 12 are to detect the vibration signals of the unbalance rotor 11 and transfer the signals into an unbalance vector. In addition, the balancing machine 10 is provided with a pair of vectormeters in order to indicate the unbalance vector on the vectormeter screen. Typically, the conventional vectormeter is capable of showing the magnitude and the direction of the unbalance vector by means of an indicating spotlight appearing on the screen of the vectormeter.

Figure 2:
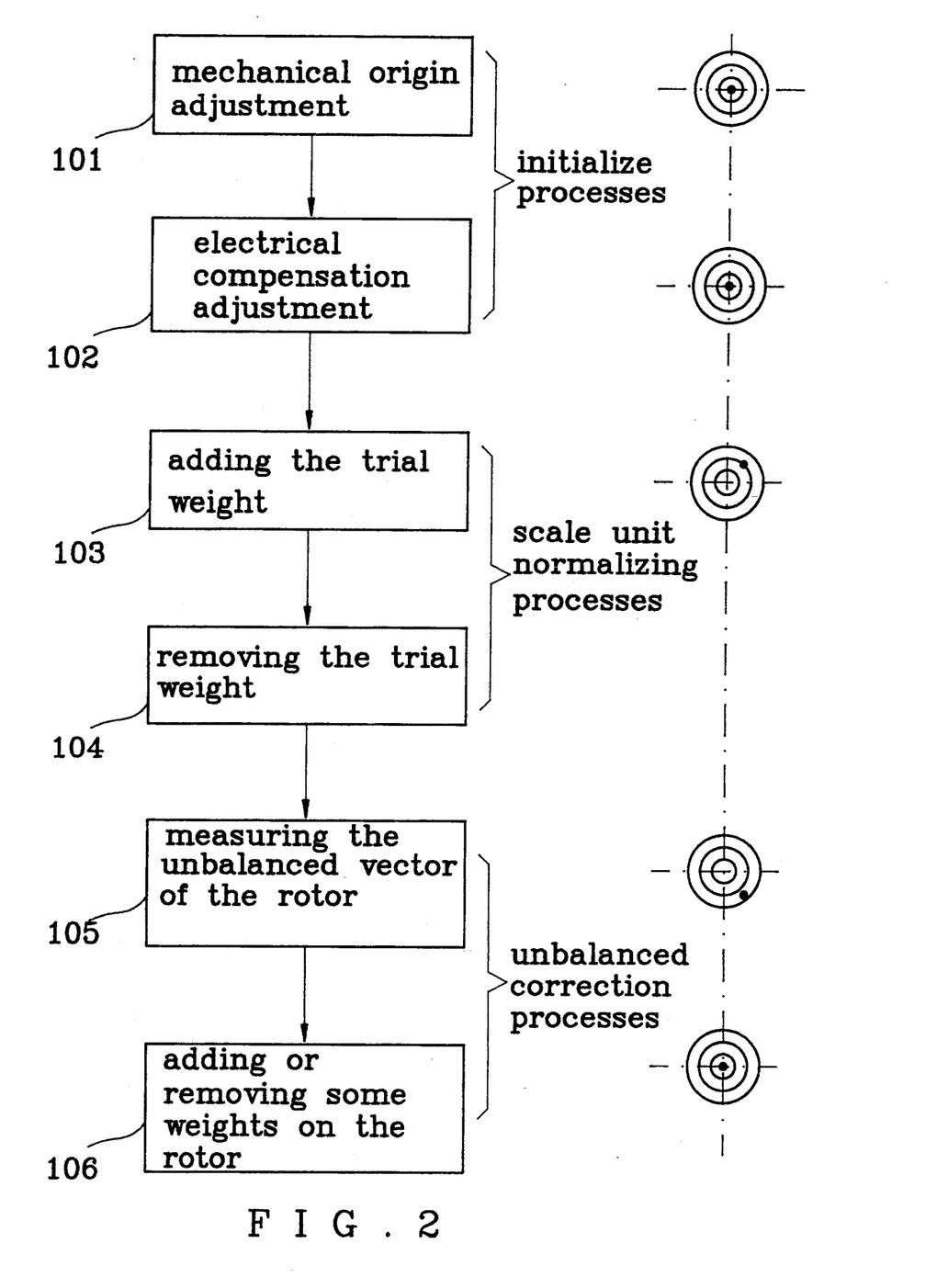
FIG. 2 is a flow chart illustrating the single plane correction procedure in a static unbalance condition.

A flow chart shown in FIG. 2 is a general procedure of a single plane unbalance correction of a disc-shape rotor. To the right of the flow chart, there are correspondingly illustrated that different vectorial positions of the indicating spotlight appearing on the vectormeters during the correction operation. Such a general correction approach typically includes a mechanical origin adjustment step 101, an electrical compensation adjustment step 102, a trial weight adding step 103, a trial weight removing step 104, an unbalance vector measuring step 105, and an unbalance correction step 106 by adding or removing some weights on the rotor. Once the rotor reaches a unbalance condition, the indicating spotlight will appear around the center of the vectormeter. As stated above, the steps 101 and 102 imply the initial processes of the balancing machine. Steps 103 and 104 represent the scale unit normalizing procedure. Steps 105 and 106 denote the unbalancing correction procedure.

The scale unit of the vectormeter should be normalized before the performance of the unbalanced correction so that the magnitude and phase angle of the unbalance vector can be measured exactly. In the prior art, a chemical clay with a known weight is prepared and adhered to the rotor at a given position, and then the indicating spotlight of the vectormeter is adjusted to a given position to accomplish the scale unit normalizing process. After the scale unit normalizing process is done, the chemical clay must be removed from the rotor.

Figure 3:
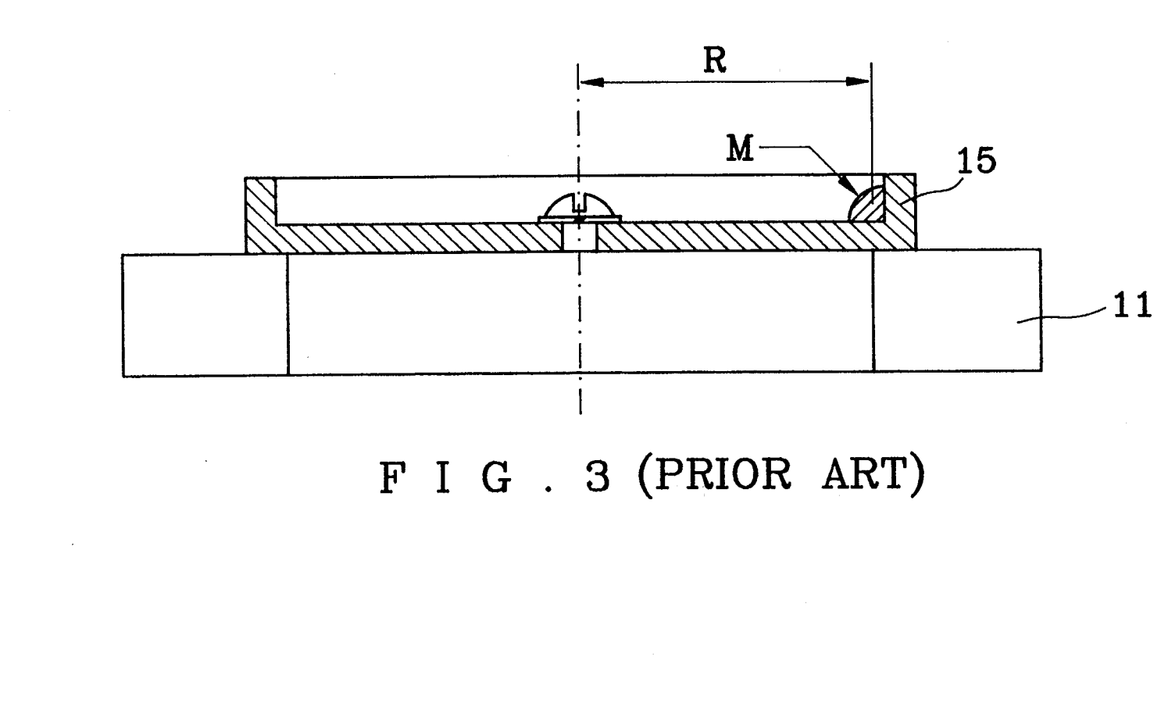
FIG. 3 is a partial cross-sectional view illustrating a chemical clay being contained in a flange attached to the rotor of the prior art.
Figure 4:
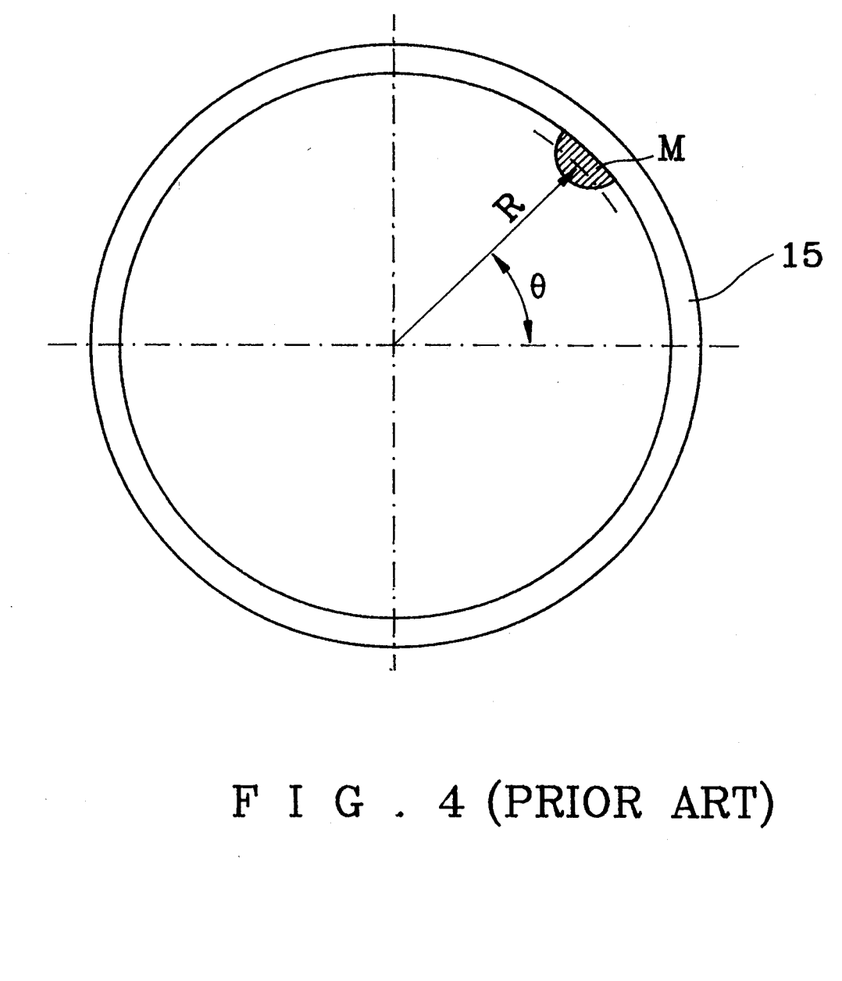
FIG. 4 shows the front plane view of the flange which exhibits the existence of correction variables M, R, $\theta$ in the prior art.

Conventionally, the unbalance correction method is generally performed by adding some weights opposite the unbalance vector at a certain position of the rotor. The material of additive weight is made of chemical clay. However, it is found that such conventional correction processes have the disadvantages of:

1. The scale unit of the vectormeter must be normalized by using the chemical clay. Prior to the scale unit normalizing process, the chemical clay must be prepared and weighed precisely and then adhered to the rotor at the proper position. After the scale unit normalizing process, the chemical clay must be removed from the rotor before proceeding to the next unbalance correction process. It is obvious that the performance of adhesion, weight, removal of the chemical clay is very inconvenient and wastes much time. In addition, the chemical clay is liable to adhere to the operator's hands, the rotor, and the other devices, so that it will give the user some extent of trouble.
2. To correct the unbalance rotor, a flange 15 must be previously attached or fixed on the rotor 11 for the purpose of providing a containing position for retaining the chemical clay M as shown FIG. 3, in which the radius of the flange 15 is indicated by R. In order to keep the adhered chemical clay M in the containing position of the flange 15, the structure of the flange 15 must be carefully designed to have proper radius and height. Consequently, flanges with different dimenisions must be designed to match the various rotors which will increase the cost of manufacturing.
3. During the unbalancing correction of the conventional method, a chemical clay with given weight is adhered to the rotor to make the rotor reach a balance condition. However, the existence of correction variables such as the weight of the chemical clay M, the radius R and the angle $\theta$ of the chemical clay location as shown in FIG. 4, cause the rotor to not easily reach a balance condition. Therefore, it is necessary to reperform the correction test until the rotor reaches an acceptable balance condition, which is more time consuming.

SUMMARY OF THE INVENTION

For alleviating the aforementioned drawbacks and problems found in the prior art, a two-dimension unbalance correction device is presented here. The primary object of the present invention is to provide an improved device for correcting the unbalance of a rotor. More specifically, the present invention is a two dimension unbalance correction device capable of indicating the correction vector which corresponds with the unbalanced vector on the vectormeter.

Another object of the present invention is to provide a two dimension unbalance correction device capable of correcting the unbalance rotor by resolving the measured unbalance vector into two-dimensional components conveniently and then correcting the two components respectively.

The features and advantages of the present invention are as follows:

1. The correction method of the present invention is simple, convenient, inexpensive, and time-saving.
2. The micro-position adjustment and various choices of correction bolts are available for precisely performing the correction procedure.
3. The present invention may be applied to various applications such as the polygon motor, disc drive, gyroscope, crank of an engine, fly wheel, rotor of a machine tool, propeller of marine diesel engines, etc.

4. The present invention is provided with a regular correction disc which may be fixed onto the different categories of the rotor and engraved with normalized scale units and phase angle to facilitate the correction procedures.

The other objects and features of the invention will become more apparent from the following description with reference to the accompanying drawings. The following example is one of the preferred embodiments and any of the other specific forms, without departing from its spirit or essential characteristics, are intended to be embraced.

BRIEF DESCRIPTION OF THE DRAWINGS

FIG. 10 represents the relationship between the magnitude of the correction component vectors and the value n and To;

DETAILED DESCRIPTION OF THE INVENTION

Figure 5:
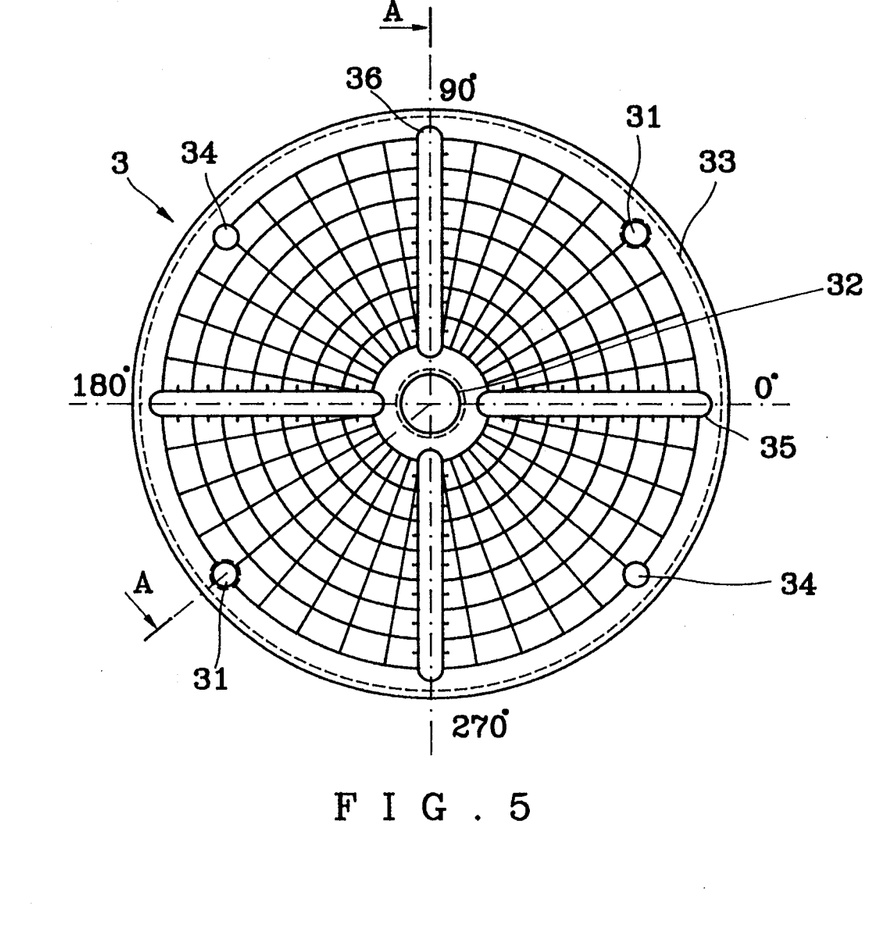
FIG. 5 shows the structure of the correction disc of the present invention.
Figure 5A:
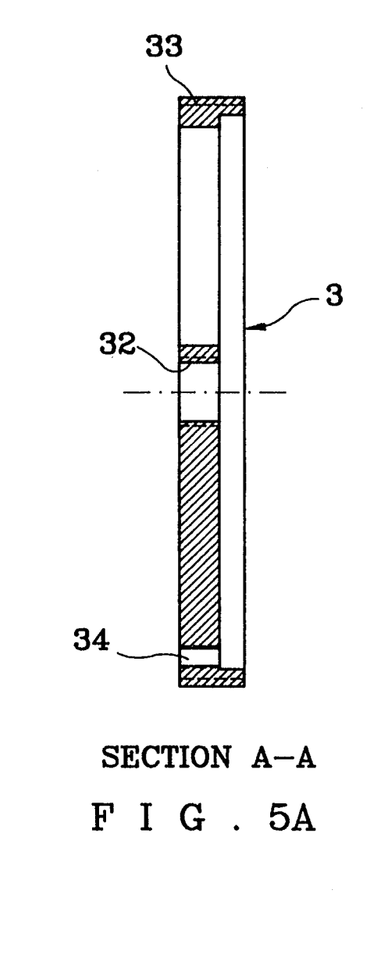
FIG. 5A is a cross-sectional view taken along line A—A of the correction disc of the present invention shown in FIG. 5.

Referring now to FIG. 5, it shows a front plane view of the correction disc of the two-dimension unbalance correction device in accordance with the present invention. FIG. 5A shows the cross-sectional view of the correction disc taken along line A—A of the correction disc shown in FIG. 5. From the drawing, it is noted that the unbalance correction device of the present invention is in a form of symmetry. On the surface of the correction disc 3, there are engraving with normalized scale units including plural concentric circles, radial extend lines radiated from the center point of the disc, and phase angles 0°–360° surroundingly marked on the corresponding outer area of the disc as shown. In addition, the correction disc 3 is provided with an internal fixed screw 32, an external fixed screw 33, two symmetrical fixed holes 34, two symmetrical trial weight screws 31, two symmetrical horizontal regulation slots 35, and two symmetrical vertical regulation slots 36 on the disc. Any of the fixed screws 32, 33 and fixed holes 34 is available for the association between the correction disc and the rotor.

Figure 6:
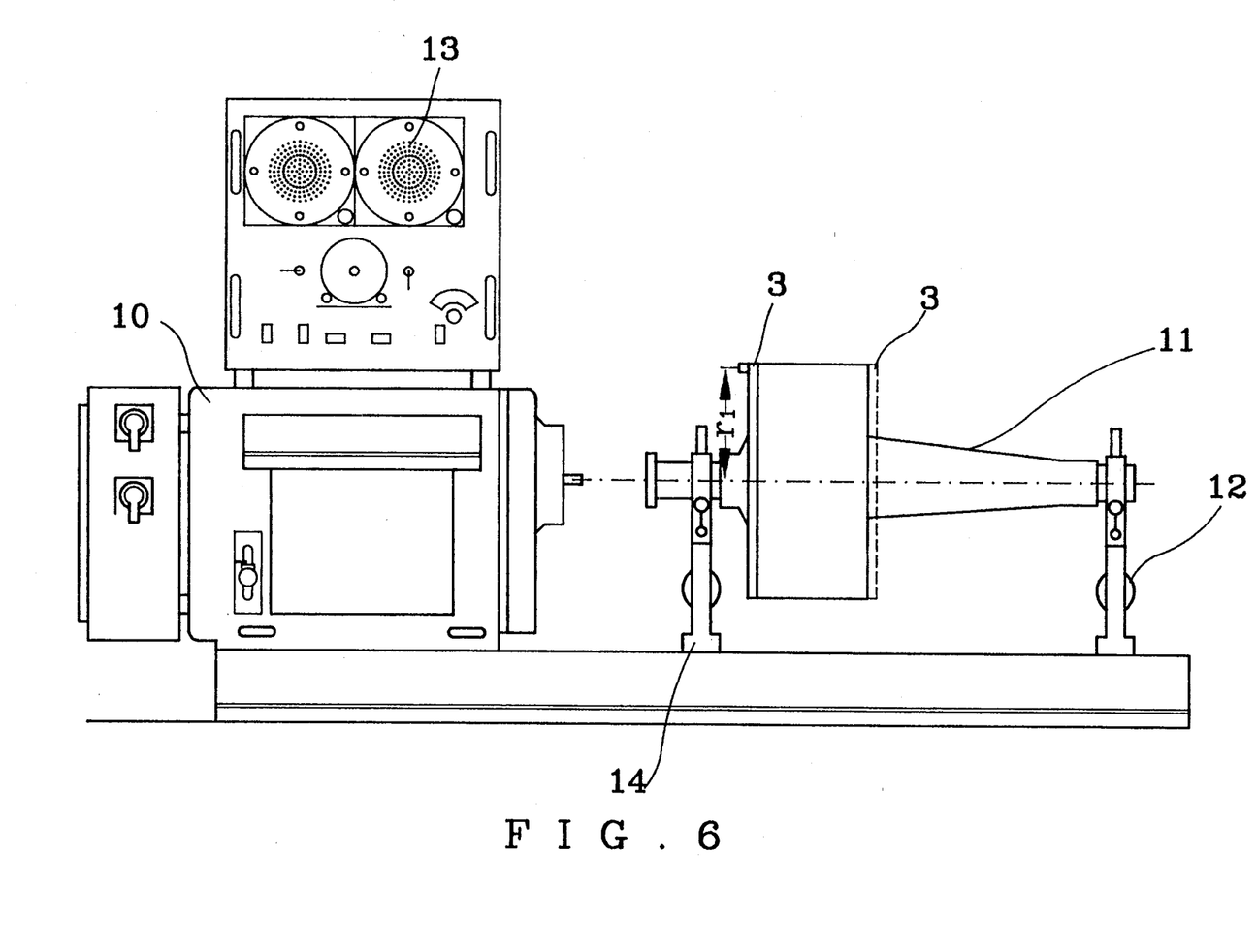
FIG. 6 is a plane view of the unbalance correction device of the present invention, which illustrates the correction disc of the present invention being attached to the rotor.

With reference to FIG. 6, the correction disc 3 may be coaxially attached to end plane of the rotor 11 by means of either the fixed screws 32, 33 and the fixed holes 34, so that the correction disc 3 may be rotated with the rotor 11 as a whole.

In the preferred embodiment of the present invention, the spiral direction of the internal fixed screw 32 and the external fixed screw 33 is contrary to the rotating direction of the rotor, so as to firmly attach the correction disc 3 onto the rotor 11 and keep the correction disc 3 from coming loose. Preferably, the internal or external fixed screws of the correction disc are smeared with adhesive materials to prevent the correction disc loosening from the rotor after a long running use.

With reference to FIG. 6 again, the two-dimension unbalance correction device in accordance with the present invention mainly consists of a balancing machine 10, a pair of vectormeters 13, a pair of pedestals 14, a phase detector (not shown), and a pair of amplitude detectors 12. In the present invention, the arrangement and assembly of the components above are similar to that of the prior art, except for the feature and design of the correction disc 3.

In a single plane correction, only one correction disc 3 is attached to one end plane of the rotor 11. In double planes correction, i.e. dynamic unbalance condition, both the side planes of the rotor 11 are attached with two correction discs, in which one of the correction discs is illustrated in a dash line as shown in FIG. 6. Thus, the correction procedures are executed in the two correction discs respectively.

Figure 7:
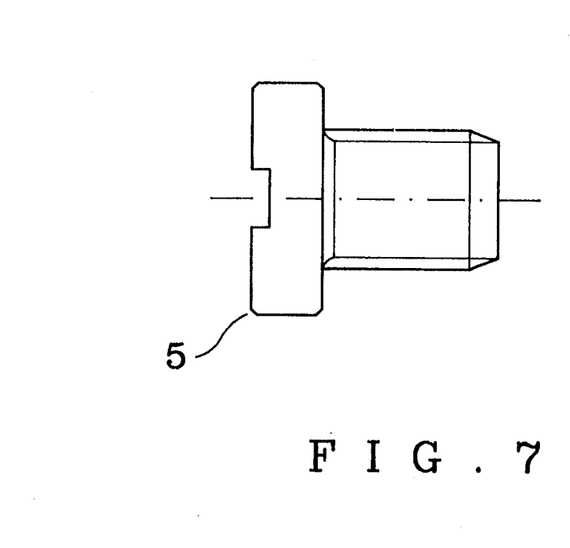
FIG. 7 illustrates the structure of the trial weight bolt of the preferred embodiment of the present invention.

In scale unit normalizing processes of the present invention, a given trial weight bolt 5 may be threaded into the trial weight screw 31 in advance of proceeding to the scale unit normalizing processes of the correction disc 3. FIG. 7 illustrates the structure of the trial weight bolt 5 of the preferred embodiment of the invention. The scale unit normalizing processes not only normalizes the unit scale of the vectormeters 13, but also normalize the unit scale of the correction disc 3 simultaneously. When performing the correction procedures, the operator can easily determine the correction vector mapping from the vectormeters and resolve this vector into two components immediately by the engraved pattern on the correction disc.

Figure 8:
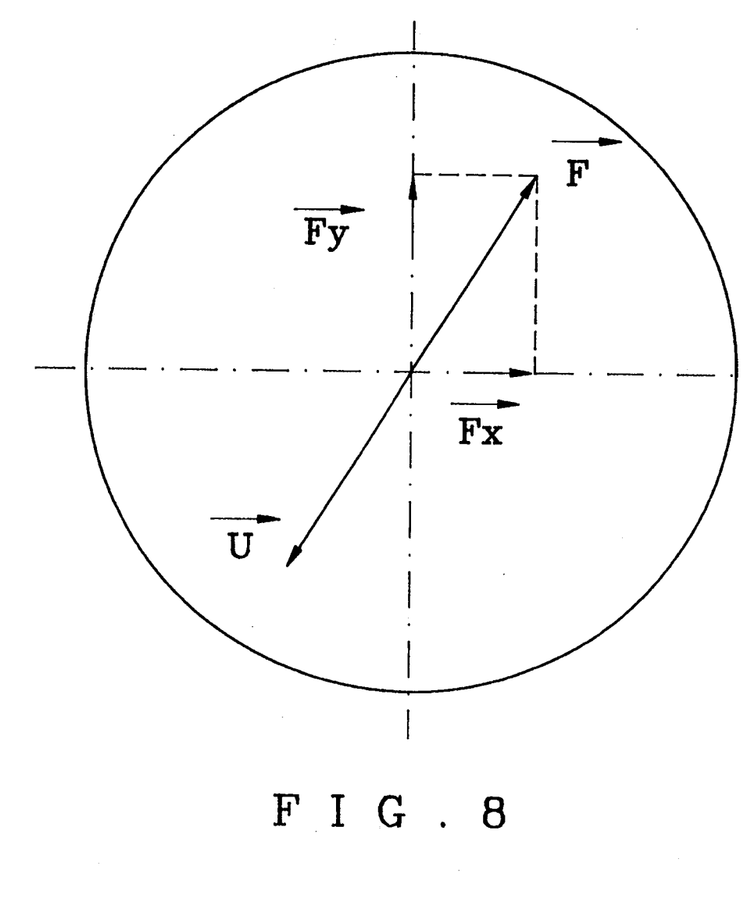
FIG. 8 is a vector which representing an unbalanced vector may be resolved into a X-axis component and a Y-axis component.
Figure 9A:
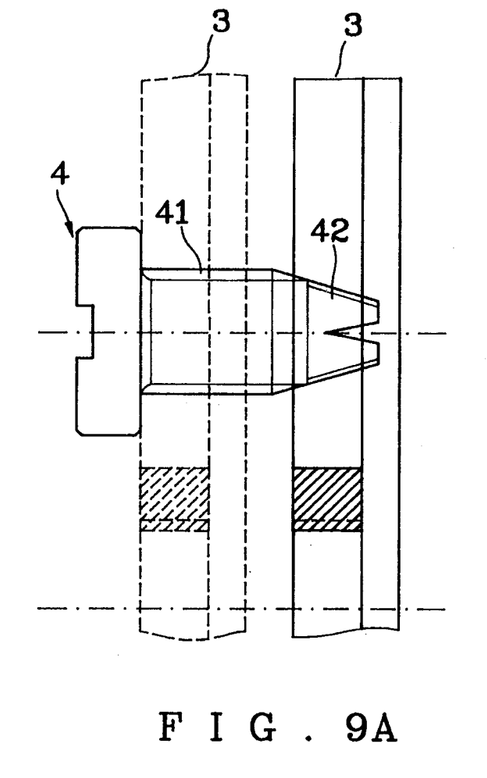
FIGS. 9A–9C exhibits, the association between the first section of the correction bolt and the correction disc and the dash line denotes the association between the second section of the correction bolt and the correction disc.
Figure 9B:
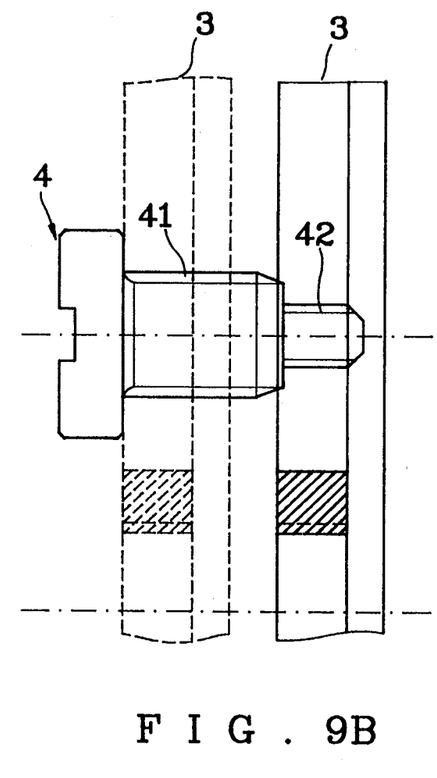
Figure 9C:
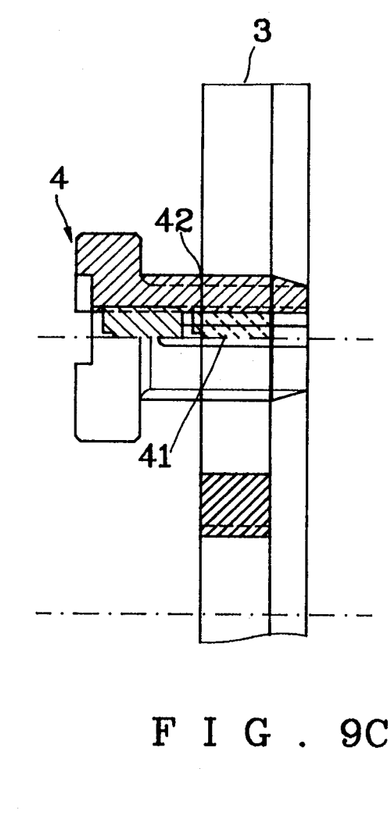
Figure 10:
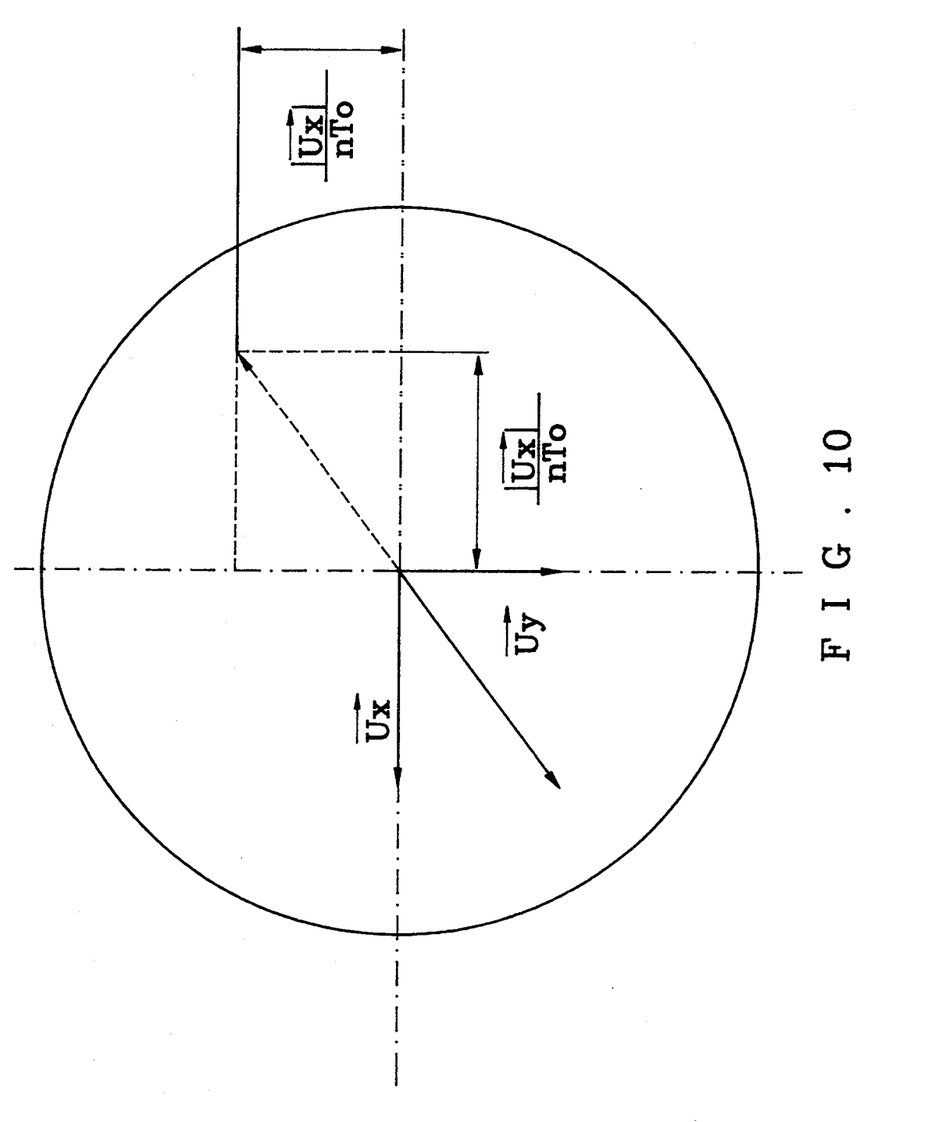

With reference to FIG. 8, it is a vector showing the two components of the measured correction vector, wherein the unbalance vector is represent by $\overline{U}$ while the reverse vector of the unbalance vector is represented by $\overline{F}$. The reverse unbalance vector $\overline{F}$ may be resolved into a X-axis component $\vec{Fx}$ and a Y-axis component $\vec{Fy}$ as shown in FIG. 8. In order to correct the unbalance vector, a correcting bolt with proper given weight may be embedded and fixed on the horizontal regulation slot and/or the vertical regulation slot at a proper position. Refer to FIGS. 9A, 9B, and 9C, which illustrate the preferred structure of the correcting bolt 4 in accordance with the present invention. In practice, the weight of the selected correcting bolt is n times that of the trial weight bolt which was used in scale unit normalizing processes. Referring to FIG. 10, the correction distance of the X-axis and Y-axis on the correction disc may be respectively represented by $$\frac{|\vec{Ux}|}{n\, To} \text{ and } \frac{|\vec{Uy}|}{n\, To}$$

where the To represents the weight of the trial weight bolt and n To means the weight of the correction bolt selected by the user, and the value n depends upon the resolution and range of the scales engraved on the correction disc.

In practice, the weight of the correcting bolt is designed to be equal to or n times (n = ..., $\frac{1}{3}$, $\frac{1}{2}$, 1, 2, 3, etc.) the weight of the trial weight bolt. Therefore, the present invention may meet the requirements of the further resolution or range amplification of the correction disc when performing the correction. The various forms of the correcting bolt may be designed to serve as the same application. In the preferred embodiment of the present invention, with reference to any of FIGS. 9A, 9B, or 9C, the correcting bolt 4 is in a form of two sections comprised of a first section 42 and a second section 41. During the correction, a correction distance may be determined previously by first screwing the first section 42 of the correction bolt on the vertical and/or the horizontal regulation slot (35, 36) of the correction disc 3. If the residual unbalance is still out of the alignment, the correction distance may be adjusted slightly. Once the residual unbalance is within the acceptable range, the correction bolt 4 may be further screwed into the regulation slot 35, 36 by screwing the second section 41 of the correction bolt. As shown in FIGS. 9A, 9B and 9C, the solid lines denote the location of the first section 41 of the correction bolt 4 for the purpose of ensuring the position of the correction bolt. The dash lines signify the exactly fixed location of the correcting bolt 4 by screwing the second section 41 when a proper correction position is finally determined.

In general, the correction bolt is made of steel, while the correction disc is made of softer material such as aluminum. The regulation slot 35, 36 of the correcting disc is used to associate with the correcting bolt permanently, when the essential correction procedures are totally accomplished.

The unbalance correction theory of the present invention will be described below. Suppose that the mass of the rotor is represented by symbol m, and the rotor rotates at a constant speed w. The distance between the rotation axis of the rotor and a given mass point mi in the rotor is known as rotation radius and may be represented by vector ri. A centrifugal force Fi will be generated within the rotor and may act on the supporting bearing of the rotor.

$$\vec{Fi} = mi \ast ri \ast w^2$$

The total centrifugal force of the rotor may be indicated by $$\vec{F} = \sum_{i=1}^{n} \vec{Fi} = \sum_{i=1}^{n} mi \ast ri\, w^2$$

where
if $\vec{F} = 0$, no centrifugal force is generated, so that the rotor is in a balanced condition;
if $\vec{F} \neq 0$, the rotor consists of a centrifugal force and therefore is in an unbalance condition.

The centrifugal force may be simplified into an unbalance vector $\vec{ur}$, i.e.

let $\sum_{i=1}^{n} mi \ast \vec{ri} = \vec{ur} = \vec{U}$ then $$\vec{F} = \sum_{i=1}^{n} mi \ast \vec{ri} \ast w^2 = \vec{ur}\, w^2 = \vec{U}\, w^2$$

Because the W is a constant speed, the unbalance vector $\vec{U}$ is the unbalance vector intended to be corrected by the present invention.

To correct the unbalance vector, the conventional correction method tries to change the correction mass opposite to the unbalanced vector at a constant radius of the rotor, which may be indicated by $$\vec{U} = r_0 \vec{m}$$

On the contrary, the present invention corrects the rotor by changing the correcting radius in two directions with a given correction mass, which may be indicated by $$\vec{U} = m_0 \vec{r}$$

Based upon the theory above, the user may first measure the unbalance vector $\vec{U}$ from the vectormeter of the balance machine and simultaneously determine the magnitude and the phase angle of the unbalance vector $\vec{U}$ by the present invention on the rotor. On the correction disc, the measured unbalance vector may be resolved into a X-axis component and a Y-axis component, which may be indicated as follows:

$$\vec{U} = \vec{Ux} + \vec{Uy}$$

Thereafter, the X-axis component $\vec{Ux}$ and the Y-axis component $\vec{Uy}$ may be corrected respectively to reach a balance condition by adding the correction bolt(s) in X-axis and/or Y-axis at a proper correction location.

The correction procedures in accordance with the present invention are listed as follows:

1. Attaching the correction disc (as shown in FIG. 5) onto the correction plane of a rotor (as shown in FIG. 6), and then rotating the rotor with a constant speed W.
2. Performing the mechanical origin adjustment and electrical compensation adjustment procedure.
3. Screwing the trial weight bolt 5 (with a given weight indicated by symbol To) in the trial weight screw 31 of the correction disc (as shown in FIG. 5), and then adjusting the spotlight of the vectormeter to the unity of the scale.
4. Removing the trail weight blot 5, and then measuring the magnitude and the phase angle of the unbalance vector $\vec{U}$ on the vectormeter.

5. Determining the correction vector $\vec{F}$ on the correction disc and resolving the correction vector $\vec{F}$ into a X-axis component $\vec{Fx}$ and a Y-axis component $\vec{Fy}$, and then producing the $\vec{Fx}$ and $\vec{Fy}$ on X-axis and/or Y-axis respectively. In order to correct the unbalance vector $\vec{Ux}$ and $\vec{Uy}$, a proper correction position on X-axis and Y-axis where a given correction bolt must be first determined. For this purpose, the processes are provided and further described below.

If the weight of the correction bolt is n times the weight represented by To of the trial weight bolt (as shown in FIG. 10), a correction bolt must be screwed at a specific position opposite to the X-axis unbalance vector $\vec{Ux}$ to balance the X-axis unbalance component. The position where the correction bolt is located may be indicated as follows:

$$\frac{|\vec{Ux}|}{n\,To}$$

Similarly, a correction bolt must be screwed at a specific position opposite to the Y-axis unbalance vector $\vec{Uy}$ to balance the Y-axis unbalance component. The position where the correction bolt is located is indicated as follows:

$$\frac{|\vec{Uy}|}{n\,To}$$

In case that the resolution of the correction disc does not meet the practical requirement, it is easy to overcame by replacing the correction bolt with the different weight. The weight of the correction bolt chosen by operator is n times of the trial weight bolt which is previously used in scale unit normalizing processes.

The present invention will be further described below by using an example.

Figure 11:
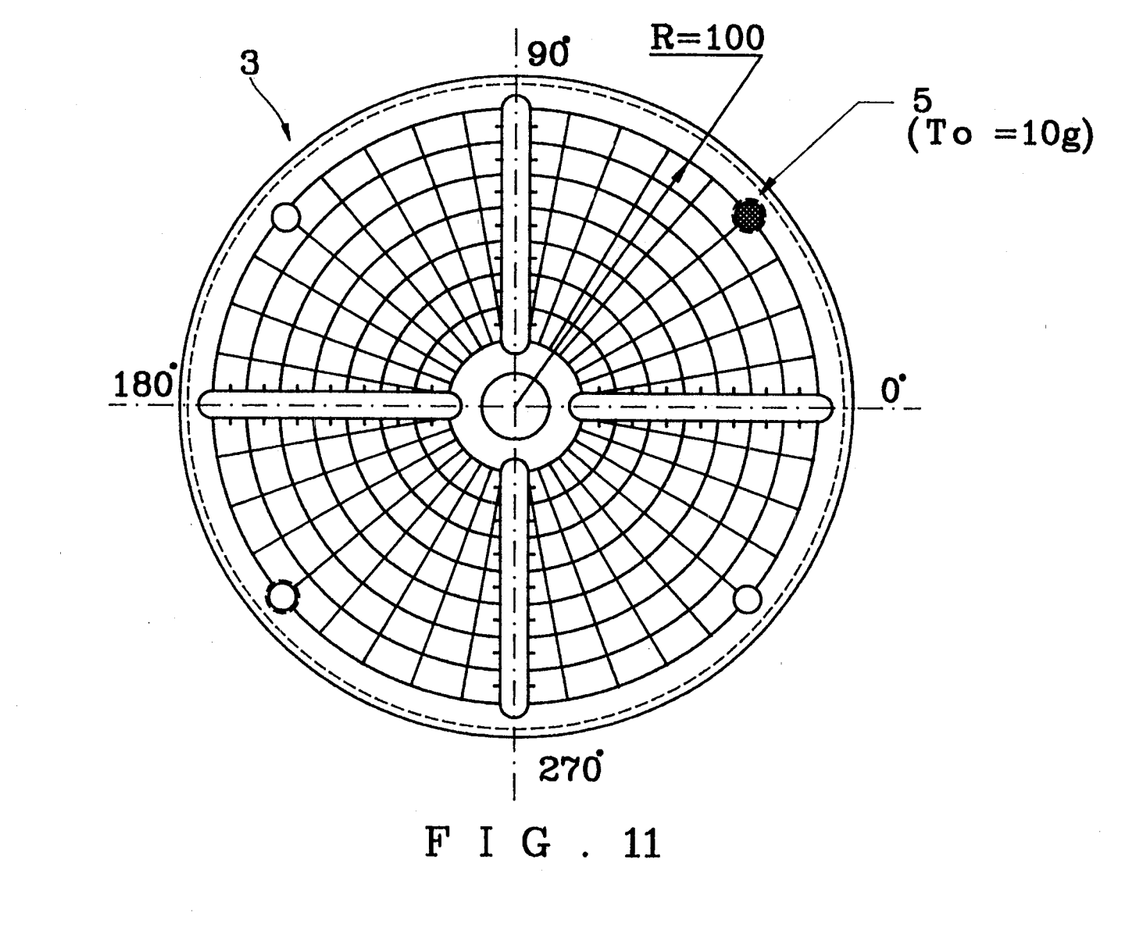
FIG. 11 shows a trial weight bolt which is fixed on the correction disc at a position of radius R=100 mm during scale unit normalizing processes.
Figure 12:
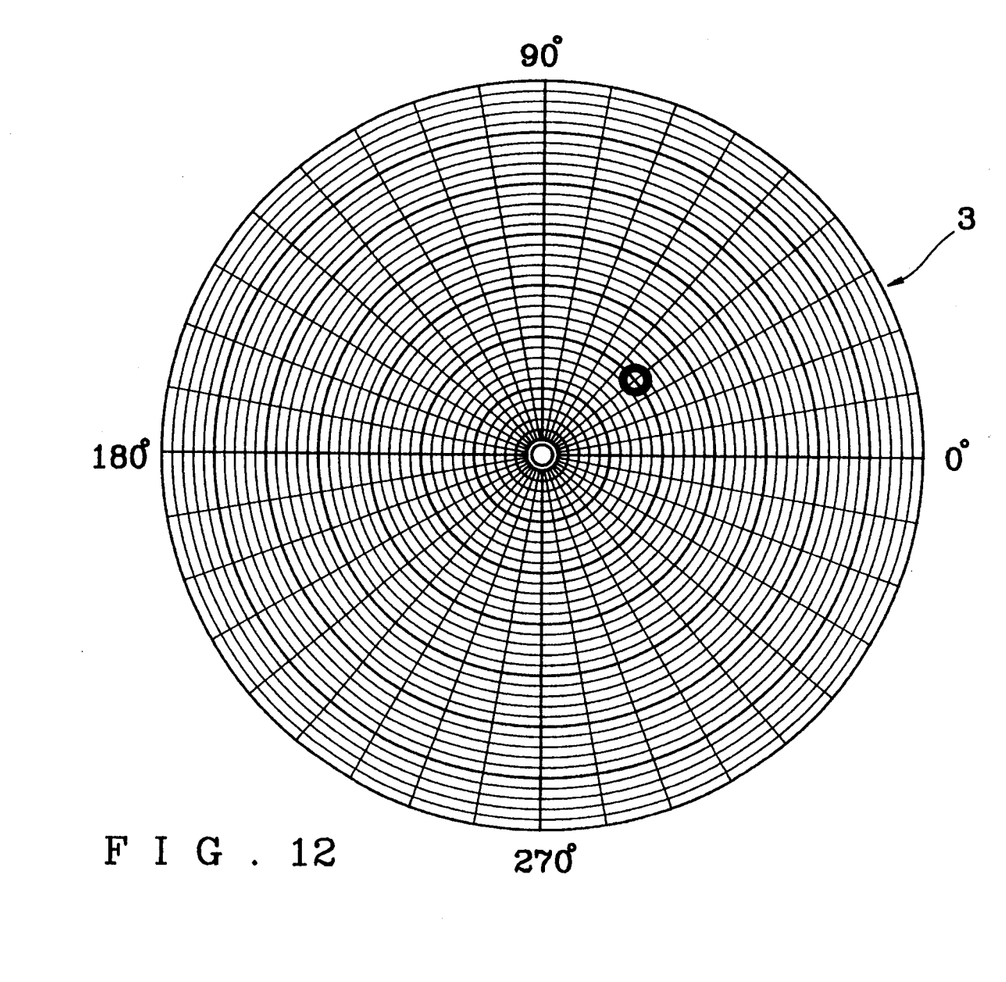
FIG. 12 is a diagram showing the indicating spotlight of the vectormeter which is adjusted to a specific position during scale unit normalizing processes.

1. Performing the mechanical origin adjustment and electrical compensation adjustment before the correction procedure.
2. Fixing a trial weight bolt 5 with weight of To=10 g on the correction disc at position of radius R=100 mm as shown in FIG. 11, and then adjusting the indicating spotlight on the screen of the vectormeter to appear around a specific unity circle as shown in FIG. 12. In such a case, the magnitude of the unbalance vector indicated on the unity circle is as follows:

$$|\vec{U}|=m_o|\vec{r}|=10*100=1000\text{ g.mm}$$

Figure 13:
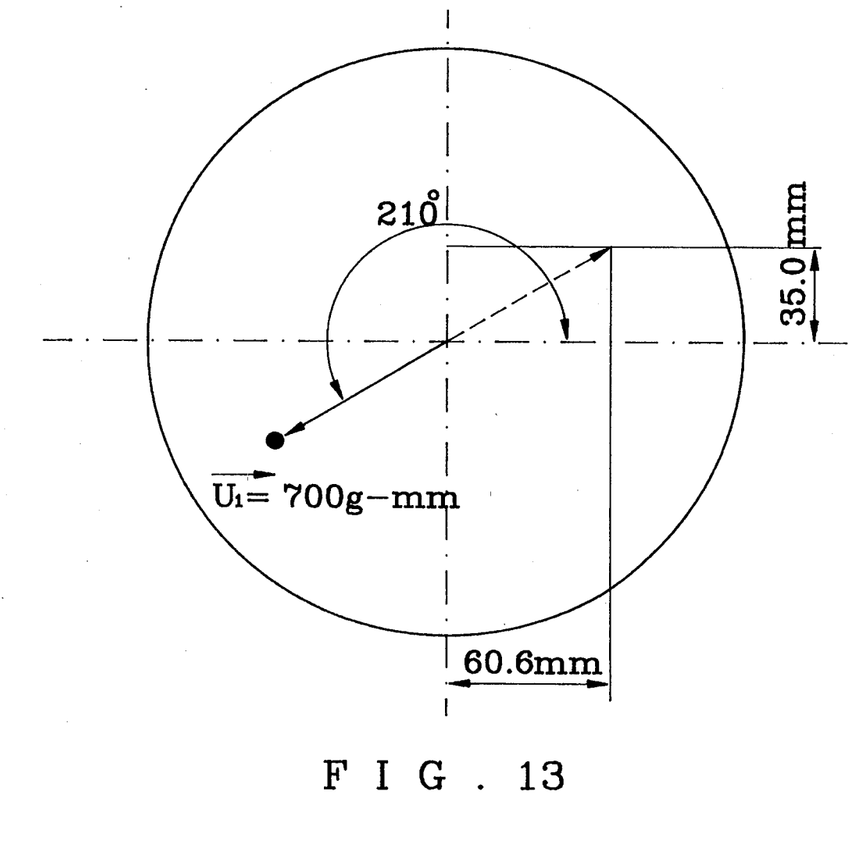
FIG. 13 illustrates the two components of the correction vector and the magnitude of the unbalance vector $\overline{U1}$ is 700 g.mm and the phase angle thereof is 210°.

3. Removing the trial weight bolt and then measuring the unbalance vector of the rotor. At this time, the unbalance vector $\vec{U1}$ may be read from the vectormeter of the balancing machine. As shown in FIG. 13, the unbalance vector $\vec{U1}$ is seven-tenths of the specific unity circle; the amount of $\vec{U1}$ is 700 g.mm, and the phase angle thereof is 210.
4. Resolving the measured unbalance vector into two components $\vec{U1x}$ and $\vec{U1y}$ on the correction disc, i.e.

$$\vec{U1}=\vec{U1x}+\vec{U1y}=-606.2\vec{i}-350\vec{j}$$

If the resolution of the correction disc is enough, so a correction bolt with weight equal to the trail weight screw(i.e. n=1) is used. Thereafter, as shown in FIG. 13, the position of the correction bolts which screw on X-axis and Y-axis regulation slots may be determined as follows: X-axis: the position is at 606.2/10=60.6 mm and opposite to the unbalance component $\vec{U1x}$; Y-axis: the position is at 350/10=35 mm and opposite to the unbalance component $\vec{U1y}$.

Figure 14:
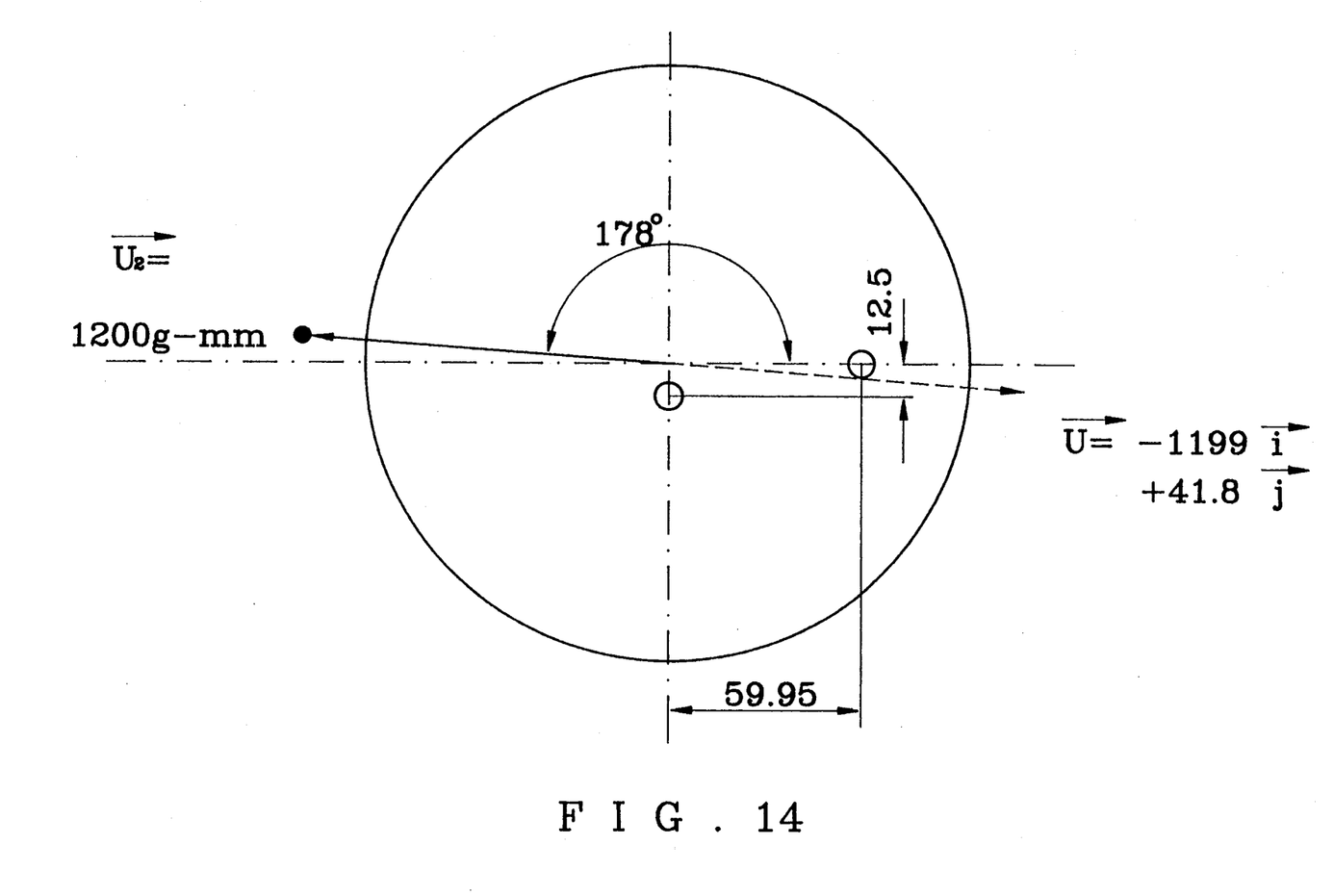
FIG. 14 illustrates the two components of the correction vector and the magnitude of the unbalance vector $\overline{U2}$ is 1200 g.mm, and the phase angle thereof is 178°.

5. If the vectormeter shows an unbalance vector $\vec{U2}$ with magnitude of 1200 g.mm and phase angle of 178° as shown in FIG. 14, the unbalance vector $\vec{U2}$ may be represented as follows:

$$\vec{U2}=\vec{U2x}+\vec{U2y}=-1199\vec{i}+41.8\vec{j}$$

In this case, the unbalance vector $\vec{U2}$ exceeds the maximum effective range of the correction disc. Hence, a correction bolt with a weight twice the weight of the trial weight screw (i.e. n=2) must be chosen and fixed at the X-axis, the proper position of which is at $$\frac{|\vec{Ux}|}{n\,To}=\frac{1199}{2*10}=59.95\text{ mm}$$

As to the Y-axis, a correction bolt with a weight ⅓ times the weight of the trial weight screw (i.e. n=⅓) must be chosen and fixed at the Y-axis, the proper position of which is at $$\frac{|\vec{Uy}|}{n\,To}=\frac{41.8}{(1/3)*10}=12.5\text{ mm}$$

Comparing the present invention with the prior art, the advantages of the correction device of the present invention are as follows:

1. The spiral direction of the fixed screw used to fix the correction disc is contrary to the rotating direction of the rotor, so as to firmly attach the correction disc onto the rotor.
2. It is possible to save large amounts of time and labor during correction procedures.
3. On the surface of the correction disc, there are engraved with normalized scale capable of mapping with the unbalanced vector of the vectormeter of the balancing machine, so that the user may easily and directly read the measured vector and proceed to the correction.
4. The correction disc of the present invention may easily be attached to the different kinds of rotors, which may save much time in various applications and reduce the costs.
5. The correction bolt of the present invention is designed to have a two-section structure for convenience and precise adjustment.
6. The present invention does not use chemical clay, and therefore it may effectively alleviate the problems of using the chemical clay described above.

So far, the features of the present invention have been described. It will be obvious to those skilled in the art of using this invention according to the above detailed description. While the arrangement herein described constitutes a preferred embodiment of this invention, it is to be understood that various changes and modifications may be made therein without departing from the scope and the spirit of the invention as defined in the appended claim.

We claim:

1. A two-dimension unbalance correction device for measuring and correcting an unbalance vector of a rotor, the correction device comprising a horizontal correction mechanism and a vertical correction mechanism, both of which being coaxially and concentrically disposed about an end plane of the rotor and synchronously rotated therewith, the horizontal and vertical correction mechanisms being engraved thereon with a plurality of concentric circles, radial scales, and phase angles so as to correct the unbalance rotor by resolving the unbalance vector of the rotor into plural components and correcting the plural components respectively.

2. A two-dimension unbalance correction device for measuring and correcting an unbalance vector of a rotor, comprising a vectormeter and a correction disc provided with plural symmetrical fixed holes and/or fixed screws, two symmetrical horizontal regulation slots, two symmetrical vertical regulation slots thereon, the correction disc being attachable via the fixed holes or the fixed screws, to the rotor and synchronously rotated therewith, the correction disc being engraved, on its surface, with plural concentric circles, radial scales, and phase angles for indicating the magnitude and the phase angles for indicating the magnitude and the phase angle of the unbalance vector during unbalance correction.

3. A device as claimed in claim 2, wherein the correction disc comprises a trial weight screw which allows a trial weight bolt to be screwed thereinto for the purpose of normalizing a scale unit of the vectormeter and the correction disc.

4. A device as claimed in claim 3, wherein the correction device enables the unbalance vector to be resolved into horizontal and vertical components and a correction bolt with a weight n times the weight of the trial weight bolt, wherein n is an integer or a fraction, is selected for correcting the horizontal and vertical components of the unbalance vector respectively.

5. A device as claimed in claim 2, the spiral direction of the fixed screw used to fix the correction disc on the rotor is contrary to the rotating direction of the rotor so as to firmly attach the correction disc onto the rotor.

6. A device as claimed in claim 3, wherein the correction bolt is provided with a two-section structure; the first section is screwed into regulation slots when a trial correction position is first determined and the second section is further screwed into regulation slots when a proper correction position of the correction bolt is finally found.

7. A device as claimed in claim 6, wherein the weight of the correction bolt is a multiple or a fraction of the weight of the trial weight bolt which is previously used in scale unit normalizing processes.

* * * * *